(12) United States Patent
Cook et al.

(10) Patent No.: US 7,517,375 B2
(45) Date of Patent: Apr. 14, 2009

(54) WEAR-RESISTANT BORIDE COMPOSITES WITH HIGH PERCENTAGE OF REINFORCEMENT PHASE

(75) Inventors: Bruce Allan Cook, Ankeny, IA (US); Joel Lee Harringa, Ames, IA (US); Alan Mark Russell, Ames, IA (US); Justin S. Peters, Ames, IA (US); Atiq Ahmed, Costa Mesa, CA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 408 days.

(21) Appl. No.: 11/325,292

(22) Filed: Jan. 4, 2006

(65) Prior Publication Data
US 2007/0151167 A1   Jul. 5, 2007

(51) Int. Cl.
*C09K 3/14* (2006.01)
*C22C 29/00* (2006.01)
*C22C 29/12* (2006.01)
*C04B 35/00* (2006.01)

(52) U.S. Cl. .............................. 51/309; 75/230; 75/235; 501/96.3

(58) Field of Classification Search .................. 51/309; 75/230, 235; 501/96.3
See application file for complete search history.

(56) References Cited

U.S. PATENT DOCUMENTS

| 4,804,642 | A * | 2/1989 | Ray | 501/87 |
|---|---|---|---|---|
| 6,099,605 | A | 8/2000 | Cook et al. | |
| 6,432,855 | B1 | 8/2002 | Cook et al. | |
| 6,921,422 | B2 | 7/2005 | Cook et al. | |
| 2005/0100748 | A1 | 5/2005 | Cook et al. | |

FOREIGN PATENT DOCUMENTS

EP   0 659 894 A3   6/1995

OTHER PUBLICATIONS

B. A. Cook, J. L. Harringa, T. L. Lewis and A. M. Russell, A new class of ultra-hard materials based on AlMgB14, Scripta Materialia vol. 42, Issue 6, , Feb. 28, 2000, pp. 597-602.*

B. A. Cook, A. M. Russell, J. L. Harringa, A. J. Slager and M. T. Rohe, A new fracture-resistant binder phase for use with AlMgB14 and other ultra-hard ceramics, Journal of Alloys and Compounds vol. 336, Issues 1-2, , Mar. 10, 2004, pp. 145-151.*
Theron L. Lewis. "Study of selected properties and applications of almgb14 and related composites: ultra hard materials" Thesis (M.S.); Submitted to Iowa State Univ., Ames, IA (US); May 28, 2002.*
PCT US2006/000400 Search Report, mailed Mar. 12, 2007.
Ahmed, A., et al., "Mechanical properties and scratch test studies of new ultra-hard AlMgB14 modified by TiB2", Tribology International 39:129-137 (2006).
Cook, "A new fracture-resistant binder phase for use with AlMgB14 and other ultra-hard ceramics", J. of Alloys and Compounds, 366: 145-151 (2004).
Higashi, Iwami et al., "Boron-rich crystals in Al-M-B (M = Li, Be, Mg) systems grown from high-temperature aluminum solutions", J. of Crystal Growth, 128:1113-1119 (1993).
Peters, J.S., et al., "Direct reaction synthesis of Mg2B14 from elemental precursors", Scripta Materilia 54:813-816 (2006).
Chuang, Shih-Cheng et al., "In situ reacted TiB2-reinforced alumina", Journal of Materials Science 27 (1992), pp. 6213-6218.
Hawk, J. A. et al., "Abrasive wear behavior of NiAl and NiAl-TiB2 composites", Wear 225-229 (1999), pp. 544-556.
Ho, C. T., "In situ reacted TiB2-reinforced mullite", Journal of Materials Science 30 (1995), pp. 1338-1342.
Liu, Su et al., English Abstract for "Behavior of titanium-diboride dispersed alumina cutting tools and their properties", (1997) 18(6)58-59 (in Chinese). ISSN 1007-1741.
Park, Yong-Kap et al., "Mechanical properties and Electrical Discharge Machinability of Beta-Sialon-TiB2 Composites" The Korean Journal of Ceramics, 5[1] (1999), pp. 19-24.
Sato, Tadao et al., "Structure and Hardness of TiAl-TiB2 Composite Prepared by Hot Isostatic Pressing of Mechanically Alloyed Powders", J. Japan Inst. Metals, vol. 56, No. 11 (1992), pp. 1336-1342.
Tee, K. L. et al., "Wear Performance of in-situ Al-TiB2 composite", Wear 240 (2000), pp. 59-64.

* cited by examiner

*Primary Examiner*—Jerry Lorengo
*Assistant Examiner*—Matthew E Hoban
(74) *Attorney, Agent, or Firm*—McKee, Voorhees & Sease, P.L.C.

(57) ABSTRACT

A highly wear resistant sintered, hot pressed, or otherwise compacted ceramic composite material is described, consisting of two discrete phases of the form $Al_xMg_yB_{14}$ where x and y $\leq 1$ or like hard, orthorhombic compounds, and $TiB_2$ or like Group IVB transition metal di-borides, and with an unexpectedly high content of transition metal di-boride in the range from 40 to 90 percent (28 to 85 volume percent).

15 Claims, 3 Drawing Sheets

WEAR-RESISTANT BORIDE COMPOSITES WITH HIGH PERCENTAGE OF REINFORCEMENT PHASE

GRANT REFERENCE

This research was federally funded under DOE Contract No. W-7405-ENG-82. The government may have certain rights in this invention.

FIELD OF THE INVENTION

The field of this invention involves ultra hard boride based composites with extremely high wear resistance.

BACKGROUND OF THE INVENTION

The materials described in this invention partially relate to constituents defined in a prior patents, U.S. Pat. No. 6,099,605 and its Divisional, U.S. Pat. No. 6,432,855; the first issued Aug. 8, 2000 and the second Aug. 13, 2002. Those patents describe a ceramic material which is based on an orthorhombic boride of the general formula: $AlMgB_{14}$. The ceramic is super abrasive, and in most instances exhibits a hardness of 30 GPa or greater. This invention relates to new compositions involving the use of $AlMgB_{14}$ and $TiB_2$ together in high percent $TiB_2$ formulations as a strengthening reinforcement to provide composites of extremely high erosive and abrasive wear resistance.

Erosive and abrasive wear may both be viewed as surface damage resulting from the relative motion with another body. Where the two forms of wear diverge involves the nature of the relative motion. According to ASTM G40, abrasive wear is degradation 'due to hard particles or hard protuberances forced against and moving along a solid surface;' whereas erosive wear is defined as 'the progressive loss of original material from a solid surface due to mechanical interaction between that surface and a fluid, a multi-component fluid, or impinging liquid or solid particles.' Erosion may be viewed as mechanical or physical surface damage resulting from impingement by solid particles or liquid droplets. Erosive wear is a function of the number of impacts and the momentum transferred per impact, and is typically measured by the change in mass (or volume) of a material after exposure to an abrasive particle flux. Variables include impingement angle, particle speed upon impact, particle morphology, and duration of erosion.

Ultra-hard materials are commonly used for wear-resistant applications and also for advanced cutting tools. Such materials are needed in many application such as earth moving, mining, abrasive slurry transport, rock drilling etc. where they experience sliding or impacting interaction with abrasive particles. Wear is also important in processes such as grinding, lapping and polishing that are used for shaping materials to conform to precise dimensions or to achieve smooth surface finish. Since super hard materials cannot be machined by a conventional single-point cutting process, abrasive machining is the only feasible process to finish these materials.

In view of its commercial significance, many researchers have tried to study the mechanisms involved in wear. Others have studied these mechanisms with the objective of increasing material removal efficiency in abrasive machining of hard materials. The problem with enhancing the material removal rates is the surface and subsurface damage that occurs which is detrimental to mechanical properties. In their studies on hard ceramic materials, some workers have concluded that the major surface damage patterns due to grinding are microplastic deformation, fracture chipping pits, microcracks and fragmentation in the damaged region of the material. At sufficiently low loads or with small particles, fracture may be suppressed and abrasive wear may occur by plastic deformation. At higher loads or with larger particles, brittle facture occurs leading to a much higher wear rate. According to Gee (M. G. Gee, *Low load multiple scratch tests of ceramics and hard metals, Wear, Vol.* 250, 2001, pp. 264-281), fracture of hard metals occurs on a fine scale and fracture of ceramics occurs on a large scale, often removing large fragments of material. Malkin and Ritter (S. Malkin, J. E. Ritter, *Grinding mechanisms and strength degradation for ceramics, J. Eng. Ind., ASME Trans.* 111 (1989) 167-174) studied the mechanisms of grinding of ceramics. They concluded that at low loads material removal occurred by plastic deformation and at higher loads by fracture. In the latter case, the finished surface was highly fragmented, and the strength after grinding was lower.

As for the effect of abrasive machining, the strength of ceramics decreases due to the increase in the subsurface damage caused by grinding and abrasive machining (T. J. Strakna, S. Jahanmir, R. I. Allor, K. V. Kumar, *Influence of grinding direction on fracture strength of silicon nitride, J. Eng. Mater. Tech., ASME Trans.* 118 (1996) 335-342). Though the surface after machining often appears smooth, cracks have been detected below the surface (H. H. K. Xu, L. Wei, S. Jahanmir, *Grinding force and microcrack density in abrasive machining of silicon nitride, J. Mater. Res.* 10 (12) (1995) 3204-3209). This damage has been attributed to the pileup of residual stresses from mechanical and thermal effects. Johnson-Walls and Evans (D. Johnson-Walls, A. G. Evans, Residual stresses in machined ceramic surfaces, *J. Am. Ceram. Soc.* 69 (1986) 44-47) studied the residual stresses in ceramics and concluded that the intensity of stresses increased with hardness and was also influenced by other material properties such as fracture toughness and modulus of elasticity.

It has been suggested that fracture toughness and hardness are the most important mechanical properties affecting the abrasion of brittle materials. Gahr (K. H. Z. Gahr, *Microstructure and Wear of Materials, Elsevier, Amsterdam,* 1987, pp. 180181) and Mao (Mao, D. S (Zhejiang Univ); Li, J.; Guo, S. Y., Study of abrasion behavior of an advanced Al203-TiC—Co ceramic, *Wear,* v 209, n 1-2, Aug, 1997, p 153-159) studied the abrasion wear resistance of several alumina ceramics and concluded that wear resistance was governed primarily by the toughness of the ceramic. The early work by Khrushchov and Babichev (Khrushchov M M, Babichev M A. *Friction and Wear in Machinery.* 1958;12:1-13) on pure metals showed that abrasion rates were inversely proportional to hardness. They also reported that abrasion was affected by several other material parameters such as elastic modulus, yield strength, crystal structure, microstructure, and composition.

Other factors affecting wear include the type of abrasive and its characteristics, speed and angle of contact, unit load of abrasive on the material, humidity, and temperature. In the case of most abrasives, hardness, toughness, angularity, and size are the important parameters (Nathan G K, Jones W J D. *Proceed. Instn. of Mechanical Engineers.* 1966-67;181:215-221; Avery H S. *The Measurement of Wear Resistance. Case Report* 340-10, *Dept. Report9AE*-134, *American Brake Shoe Company,* 1961). The shape of abrasive particles together with load influences the shape of the grooves produced in the material and transition from elastic-to-plastic contact. In belt abrasion, coolant is important for enhanced belt life, effective material removal, and reduced surface damage.

Advanced materials for wear-intensive applications must possess both toughness and hardness. Hardness is needed to resist localized plastic deformation and flow while toughness is needed to prevent microfracture and chipping. Cemented carbide (WC—Co), which is mostly WC with Co as binder, has found uses in numerous wear-intensive applications because of its moderately high hardness and high toughness. While c-BN (cubic boron nitride) is the hardest material next to diamond, its low fracture toughness makes this material prone to microfracture and chipping. Consequently, monolithic c-BN has limited utility in most wear-intensive applications. The same argument can be applied to diamond; its relatively low fracture toughness, combined with high cost, makes diamond unattractive for most wear applications.

A recent study of complex ternary borides revealed a new class of lightweight, highly wear-resistant ceramic composites. These composites of the form $M1M2B_z$ plus $M3B_2$, where M1 and M2 are metal-like elements, where $Z>=12$, where M3 is a Group IVB transition metal element (Zr, Ti, Hf), and where the weight percentage of $M3B_2$ occurs in the range from 40 to 90 percent (28 to 85 volume percent). were prepared by mechanical alloying, a high energy solid state technique, and consolidated by hot pressing. The resultant composite possesses an ultra-fine microstructure, with a typical phase spacing on the order of 50 to 200 nm. Wear resistance is strongly affected by porosity, and maximum wear resistance is achieved when the density of the composite reaches 100%.

This invention constitutes an unexpected and unanticipated departure from compositions specified in our prior U.S. Pat. Nos. 6,099,605 and 6,432,855. In these prior inventions, a ceramic material which is an orthorhombic boride of the general formula: $AlMgB_{14}$:X, with X being a doping agent or additive is made. The ceramic is a super abrasive, and in most instances provides a hardness of 40 GPa or greater, see the invention of U.S. Pat. No. 6,099,605, the disclosure of which is incorporated herein by reference.

A primary object of the present invention is to provide a new class of ceramic composites which consist of $M1M2B_{14}$ and $M3B_2$, where M1 and M2 are comprised of metal-like elements and M3 is taken from the group (Zr, Ti, Hf) or combinations thereof, but at unexpectedly high levels of $M3B_2$ to achieve high wear resistance, which is the ability of the material to withstand impingement by abrasive particles. In particular, it has been discovered that the wear resistance of $M1M2B_{14}$ where M1=Al and M2=Mg can be dramatically improved when the amount of $M3B_2$ where M3=Ti is within the range of 40% to 90% by weight. (28.3 to 85 volume %). This is contrary to expectations from previous art teachings.

BRIEF SUMMARY OF THE INVENTION

A ceramic material of superior wear resistance which comprises $AlMgB_{14}$ or like orthorhombic boride, modified with a transition metal di-boride of the form $MB_2$ at an unexpectedly high content of from 40% to 90% by weight, where M is taken from the group (Zr, Ti, Hf) or combinations thereof. These composites are characterized by a sub-micron grain size and phases possessing compatible surface energies, which leads to a low critical crack length, a high degree of grain interlocking, and enhanced stability against mass loss during impact.

DETAILED DESCRIPTION OF THE PREFERRED EMBODIMENT

The invention consists of composites of the form $M1M2B_{14}$ and $M3B_2$ where M1 and M2 are comprised of metal-like elements from the group (Al, Mg, Li, Gd, Ag, Na, Tm, Er, Y, Ho, Sc, Cr) and M3 is comprised of an element or elements taken from the group (Ti, Zr, Hf) or combinations thereof, in a composition range outside that described in U.S. Pat. Nos. 6,099,605 and 6,432,855 B1. While the earlier patents refer to the mechanical hardness of $AlMgB_{14}+TiB_2$ in weight fractions up to 30% by weight (20.2 volume %) of $TiB_2$, the current invention applies primarily to wear resistance, which is the ability of a material to withstand impingement by abrasive particulates. It has been unexpectedly discovered that the wear resistance of the ceramic compound $M1M2B_{14}$ can be dramatically improved when the amount of $M3B_2$ addition is increased to the range of 40% to 90% by weight (28.3 to 85 volume %). This discovery is contrary to conventional thinking. The amount of reinforcement phase added to ceramic matrix composites in the past has been typically limited to 30% by weight. As proof of conventional thinking, numerous references exist in the literature that teach the mechanical properties of a ceramic composite begin to degrade beyond the addition of 30 to 40 volume % of reinforcement phase: See for example:

"In situ reacted titanium boride ($TiB_2$) reinforced alumina," Chuang, Shih Cheng; Kuo, Cheng Tzu; Ho, Chi Ting; Li, Al Kang, J. Materials Science (1992) 27(22), 6213-18. Composite of $TiB_2$ in $Al_2O_3$ matrix. Composites with 20 volume % $TiB_2$ had a flexural strength of 580 MPa and a fracture toughness of 7.2 MPa-m1½; "Structure and hardness of TiAl—$TiB_2$ composite prepared by hot isostatic pressing of mechanically alloyed powders," Sato, Tadao, Miyakawa, Shunji Shimakage, Kazuyoshi, Nippon Kinzoku Gakkaishi (1992) 56(11), 1336-42 on Japanese). (Composites of TiAl with 5-50 mol. % $TiB_2$. Vickers hardness of the sintered composite increased with increasing amounts of $TiB_2$ up to a maximum of 25 mol % $TiB_2$);

"In situ reacted $TiB_2$-reinforced mullite," Ho, C. T., J. Materials Science (1995) 30(5)13338-42. "Sintered iron alloy composites with dispersed borides for high modulus materials," Sato, Takashi Tanaka, Kouji, Eur. Pat. Appl. (1995) EP 659894 A2 19950628. (Composites preferably contain 5-50 vol % borides, esp as fine (<100 μm) particles dispersed in the alloy matrix. Boride is preferably $TiB_2$);

"Behavior of titanium-boride dispersed alumina cutting tools and their properties," Liu, Su, Liu, Jun. Song, Changcai, Jiangsu Ugong Daxue Xuebao (1997) 18(6) 58-59 (in Chinese) (The best mechanical properties in $Al_2O_3$—$TiB_2$ composites are obtained when $TiB_2$ content is 20 wt %);

"Abrasive wear behavior of NiAl and NlAi-$TiB_2$ composites," Hawk, J. A. Alman, D. E., Wear (1999) 225-229 (pt. 1); (Abrasive wear NiAl with 0, 10, 20, and 40 vol %

TiB$_2$ investigated. TiB$_2$ addition as particulate reinforcement of NiAl increases the hardness of the composite over NiAl and reduces the wear rate at all volume fractions on garnet and Al$_2$O$_3$ abrasives Abrasion on SiC resulted in a minimum of the wear rate for the composite with 20% TiB$_2$ for most conditions. The composite with 40% TiB$_2$ exhibited higher wear rates than the other composites when abraded on SiC);

"Mechanical properties and electrical discharge machinability of β-Sialon-TiB$_2$ composites," Park, Yong-Kap, Kim, Jun-Tae, Balk, Yong-Hyuck, Korean Journal of Ceramics (1999). (TiB$_2$ added in 15, 30, and 45 vol % to β-Sialon matrix. The fracture toughness of the composites increased with TiB$_2$ content reaching a maximum at 30 vol. %. Toughness decreased in the 45 vol % composition); and "Wear performance of in-situ Al—TiB$_2$ composite," Tee, K. L.; Lu, L.; Lai, M. O., Wear (2000) 240(1;2) 59-64; (Wear resistance of Al-10 vol % TiB$_2$ composite had wear resistance 18.5 times higher than unreinforced Al. Al—Cu-15 vol % TiB$_2$ had 3.1 times higher wear resistance than unreinforced Al—Cu. However, increasing the volume fraction of TiB$_2$ reinforcement beyond these levels did not lead to an increase in wear resistance of the composite).

Consequently, it is neither an apparent nor a logical extension of the current state of the prior art to add M3B$_2$ to M1M2B$_{14}$ in amounts exceeding 30 weight % with the expectation of improving one or more mechanical properties.

It has now been found that this so-called rule-of-thumb (limit to 30% by weight) does not apply in the case of, for example, AlMgB$_{14}$+TiB$_2$ for wear resistance. Since many of the properties of the two borides are similar, conventional wisdom would limit the addition to 30 weight % or less., Abrasive wear and air borne particulate erosion tests have shown that AlMgB$_{14}$ has wear rates that depend on the processing route and the nature of the precursor materials used. The addition of TiB$_2$ in weight percentages exceeding 40% has now been found to result in an unexpected increase in wear resistance. In controlled, high velocity gas jet abrasion tests, the AlMgB$_{14}$+TiB$_2$ composites exhibit superior wear resistance compared with other materials such a monolithic TiB$_2$, SiC, cemented carbide, and cubic BN, discussed below.

In the following discussion, compositions of AlMgB$_{14}$ reinforced by the additions of TiB$_2$ are cited as specific examples of enhanced wear resistance, and are constituents of a more general family of closely-related composites given by M1M2B$_{14}$-M3B$_2$, where M1 and M2 are metal-like elements comprised of the group (Al, Mg, Li, Gd, Ag, Na,Tm, Er, Y, Ho, Sc, Cr) and M3 is a Group IVB transition metal taken from the group (Ti, Zr, Hf) or combinations thereof. As evidenced from the data, these composites possess hardness comparable to that of AlMgB$_{14}$ or TiB$_2$ at the lower end and cubic-BN at the high end and have a moderate toughness of 3-5 MPa√m. Initial indications of the unexpected synergy between AlMgB$_{14}$ and TiB$_2$ for enhanced wear resistance (A. Ahmed, S. Bahadur, B. A. Cook, J. Peters, "Mechanical properties and scratch test studies of new ultra-hard AlMgB$_{14}$ modified by TiB$_2$" J. Tribology International (In press)) were inferred from single-point scratch tests on AlMgB$_{14}$—TiB$_2$ composites, in which it was concluded that 70 wt. % TiB$_2$ proportion was most effective in improving scratch resistance.

CITED EXAMPLES

In a general sense, in the following examples, AlMgB$_{14}$—TiB$_2$ composites were prepared by mechanical alloying and consolidated by hot pressing at 1400° C. and 107 MPa under argon. These composites are cited as a specific example of a more general family of chemically-related composites, given by M1M2B$_{14}$-M3B$_2$, where M1 and M2 are metal-like elements comprised of the group (Al, Mg, Li, Gd, Ag, Na, Tm, Er, Y, Ho, Sc, Cr) and M3 is a Group IVB transition metal comprised of the group (Ti, Zr, Hf) or combinations thereof.

Hardness, Indentation Toughness, and Scratch Resistance:

The diamond belt abrasion resistance and gas jet erosion performance of AlMgB$_{14}$—TiB$_2$ composites were studied. For comparison, similar studies were also performed on WC—Co, β-BN, and other wear resistant materials.

Based on conventional wisdom, initial studies examined AlMgB$_{14}$—TiB$_2$ compositions up to a maximum of 30 weight % TiB$_2$, and the measured hardness, indentation toughness, and bulk density of these samples employed in scratch test studies are listed in Table I:

TABLE I

Microhardness, Indentation Toughness, and Density of AlMgB$_{14}$—TiB$_2$ samples evaluated for initial scratch resistance.

| Composition | Hardness, GPa(*) | Indentation toughness, MPa√M | Density, g/cm$^3$ |
|---|---|---|---|
| AlMgB$_{14}$ | 28-30 | 2.9-3.0 | 2.71 |
| | TiB$_2$ addition | | |
| AlMgB$_{14}$ + 10 wt. % TiB$_2$ | 29-31 | 3.0-3.1 | 2.99 |
| AlMgB$_{14}$ + 20 wt. % TiB$_2$ | 30-32 | 3.3-3.4 | 3.07 |
| AlMgB$_{14}$ + 30 wt. % TiB$_2$ | 32-34 | 3.7-3.8 | 3.22 |

(*Note that each sample contained several percent porosity, which substantially lowers hardness from the maximum attainable for that composition.)

Each hot-pressed specimen was metallographically polished to 0.05 microns. Hardness was measured with a Wilson-Tukon Vickers micro-hardness diamond indenter at a load of 1 kg. Bulk density of the samples was measured using the Archimedes technique. Indentation toughness was determined by the Palmqvist method using equation 1.

$$K_{IC} = x\left(\frac{E}{H}\right)^{1/2}\left(\frac{P}{C^{3/2}}\right) \quad (1)$$

In the Palmqvist equation, E is the material's Young's modulus, H is the Vickers hardness (kg/mm$^2$), and P is the applied load (N). The variable x is a material constant, which has been shown to be equal to 0.016 in calibration studies with a wide range of materials.

The single-point scratch test consists of applying a constant load to a diamond Rockwell indentor, and dragging the diamond tip across the polished surface of the sample. This procedure was repeated 10 times per sample, and the material removed per unit scratch length was calculated in terms of the average width of all scratches as determined by profilometry. Results are summarized in Table II.

TABLE II

Results of diamond scratch tests on AlMgB$_{14}$ samples containing varying amounts of TiB$_2$.

| Composition | 20N scratch width (microns) | 70N scratch width (microns) |
|---|---|---|
| AlMgB$_{14}$ | 108 | 244 |
| AlMgB—TiB-10% | 101 | 220 |
| AlMgB—TiB-20% | 91 | 175 |
| AlMgB—TiB-30% | 86 | 162 |

Results of these preliminary tests suggested that the composite's scratch resistance might be increased further by extending the range of TiB$_2$ reinforcement addition. Consequently, additional samples were prepared containing higher ratios of TiB$_2$ to AlMgB$_{14}$ and evaluated according to the same technique as the initial compositions. Results of hardness measurements on these compositions are summarized in Table III.

TABLE III

Microhardness, Indentation toughness, and Indentation crack length for polycrystalline, hot pressed AlMgB$_{14}$ + X wt. % TiB$_2$, where X = 0, 100. (all samples contain 1 to 5% porosity.)

| Phase | Weight % | Hardness$^{(*)}$ (GPa) | Indentation Toughness (MPa√m) | Indentation crack length (μm) |
|---|---|---|---|---|
| TiB$_2$ | 0 | 28-30 | 2.97 | 33.2 |
| | 10 | 29-31 | 3.14 | 32.1 |
| | 20 | 30-32 | 3.31 | 31.4 |
| | 30 | 32-34 | 3.71 | 29.2 |
| | 40 | 33-35 | 3.83 | 28.7 |
| | 50 | 34-36 | 3.94 | 28.2 |
| | 60 | 35-37 | 4.19 | 26.9 |
| | 70 | 36-40 | 4.07 | 27.5 |
| | 80 | 34-36 | 3.36 | 31.9 |
| | 100 | 30-32 | 3.25 | 34.0 |

$^{(*)}$1 kg$_f$ load

Table III shows that the AlMgB$_{14}$+TiB$_2$ composite attains its maximum hardness at around 60 to 70 wt % of TiB$_2$ which corresponds to approximately 50 volume percent of TiB$_2$. The composite also attains its maximum toughness at roughly the same composition.

Figure 1:
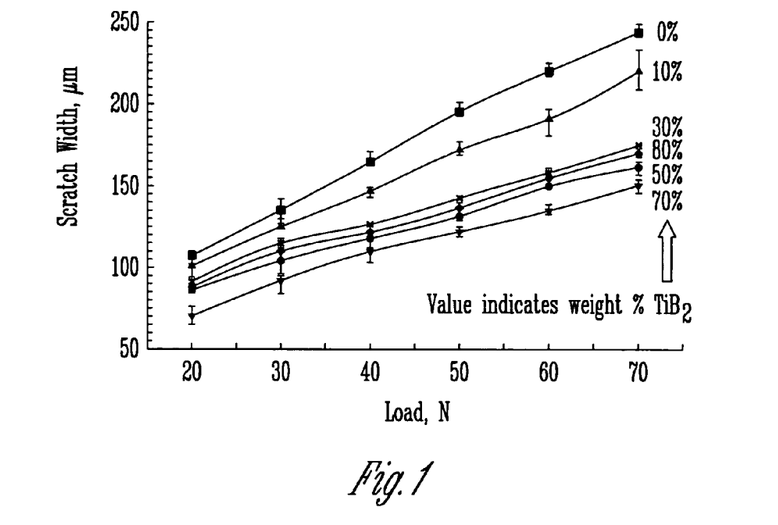
FIG. 1 shows the variation in diamond scratch width with weight % $TiB_2$ added to $AlMgB_{14}$.

FIG. 1 shows the variation of scratch width with load for various TiB$_2$ second phase additions in AlMgB$_{14}$. Within an increase in the percentage addition of TiB$_2$, the resulting scratch width descreased, suggestive of improved wear resistance. AlMgB$_{14}$ with 70 wt. % TiB$_2$ gave the highest scratch resistance and was comparable or superior to standard materials including cubic BN, SiC, and WC+Co.

Diamond Belt Abrasion Tests:

Given the promising and unexpected results from the initial diamond scratch tests, further studies were conducted to determine the effect of higher TiB$_2$ concentrations on other measures of wear resistance. Samples of AlMgB$_{14}$ containing three different amounts of TiB$_2$ (0, 30, and 70 wt%) were prepared for diamond belt abrasion tests from high-purity precursor material powders of Al, Mg, B and TiB$_2$. Mechanically alloyed powder was hot pressed under flowing argon in BN-coated graphite dies for 60 minutes at a temperature of 1400° C. and an applied pressure of 107 MPa. The resultant compacts were edge-ground using a diamond abrasive wheel to produce a flat rectangular surface of 9 mm×3 mm dimensions. The flat edge of the disk was polished successively with 45, 9, 6, 3, 1 and 0.25 μm alumina. This sequence of polishing resulted in a surface roughness (R$_a$) of about 0.1 μm.

The experimental set-up for abrasion test consisted of a diamond abrasive belt mounted on two rollers which were driven by a variable speed motor.

A fixture to load the specimen on the rotating belt surface was designed and fabricated. The specimen was secured to a spindle, which was constrained horizontally by a bushing but was otherwise free to move vertically. The friction between the spindle and bushing was negligibly small as the sliding surfaces were lubricated with lithium grease. This ensured that the load on top of the spindle was transferred to the specimen contact surface with a minimal loss estimated at 1%. In order to avoid clogging of abrasive belt with cutting particles, which would reduce the abrasion efficiency, the belt and rollers were positioned in a container filled with water which served both as a lubricant and a coolant.

In the test of abrasion resistance, the polished 9 mm×3 mm flat surface of the specimen rested on a 400-grit diamond abrasive belt with 9 mm length oriented in the direction of motion of the belt. Each test was performed for 2 minutes. In one series of experiments, the tests were conducted for a combination of 5 different surface speeds (0.42, 0.65, 1.1, 1.44, and 1.67 m/s) and 3 different loads (5, 10, and 20 N). In another series of experiments, the surface speed was held constant at 1.10 m/s, and the loads used were 15 and 25N. The latter in conjunction with the earlier tests provided the abrasion data for 5 loads at a speed of 1.10 m/s. For each condition, three repeat tests were performed.

Before and after each abrasion test, the specimen was rinsed with water and ethanol, and dried in air. It was weighed in a precision balance to an accuracy of $10^{-5}$ g in order to determine the loss of material during the abrasion test.

Figure 2:
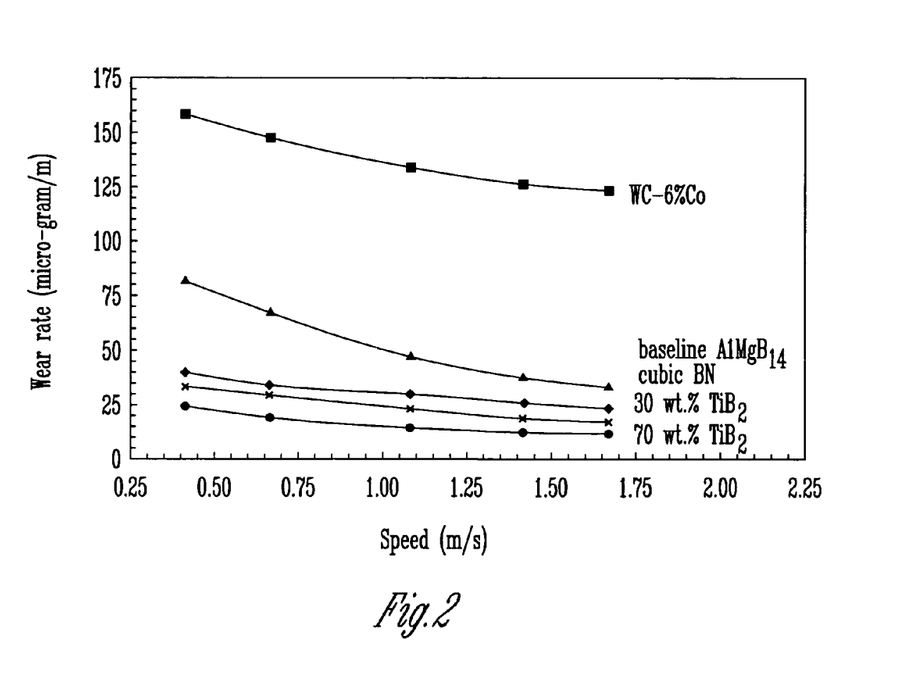
FIG. 2 shows the variation in abrasive wear rate with speed at a constant 20N loading
Figure 3:
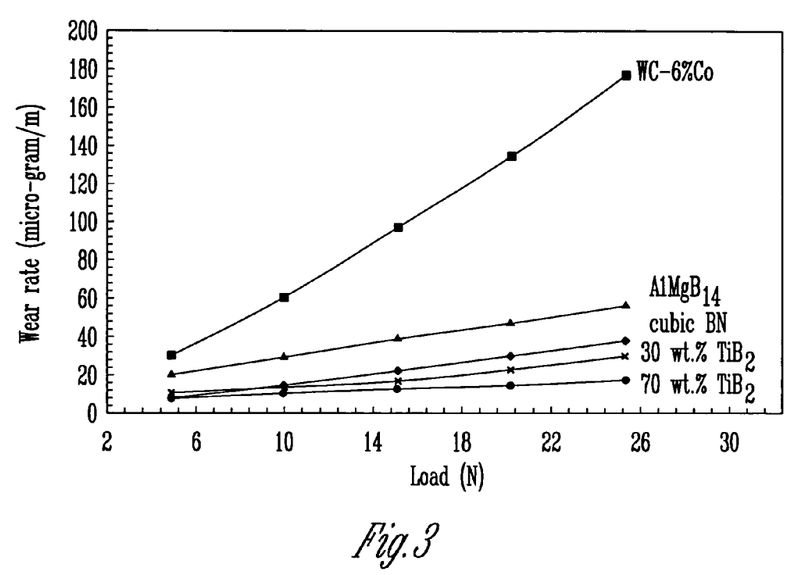
FIG. 3 shows the variation in abrasive wear rate with applied loading at a constant speed of 1.08 m/s.

FIGS. 2 and 3 show the variation in abrasive wear rate as a function of sliding speed and loads for AlMgB$_{14}$—TiB$_2$ with 0, 30, and 70 wt. % TiB$_2$ Included in these figures are the corresponding plots for WC—Co and β-BN, which were used as comparison materials in the evaluation.

It is noted that wear rates decrease with an increase in belt speed for a given load. With the increase in the belt speed from 0.42 to 0.65 m/s, there is a decrease in wear rate for some of the samples studied, but subsequently from 0.65 to 1.75 m/s a decrease eventually occurs for all samples. At a speed of 0.4 m/s, thermal effects at the interface are assumed to be negligible. Thus cutting action by the abrasive particles is quite efficient, resulting in a high wear rate. With an increase in speed to 0.65 m/s, the temperature rise at the interface becomes significant so that the action of the abrasive particles involves more plowing and gouging than cutting. As the speed is increased from 0.65 to 1.75 m/s, there is a corresponding temperature increase at the cutting interface so that the efficiency of abrasive grit decreases. Thus, the wear rate continues to decrease up to the maximum speed tested. The AlMgB$_{14}$ composites with 30 and 70 wt. % TiB$_2$, along with β-BN, exhibit higher abrasion resistance than the other two materials.

It is also observed that the wear rates increase continuously with an increase in applied load for all material. The rate of increase in wear is the highest for WC—Co, which has the lowest hardness. For the next harder material, baseline AlMgB$_{14}$, the wear rate is significantly lower. This is reflective of the fact that wear rates are proportional to the depth of embedment of abrasive particles into the material surface.

This is further supported by the observations that wear rate increases continuously with the increase in load.

Preliminary Erosion Test Screening:

Having established a maximum in abrasive wear resistance for compositions near AlMgB$_{14}$-70 wt. % TiB$_2$, an assessment of erosion resistance was performed. Measurements of the erosion resistance of a number of materials were obtained through a screening experiment in which a high-velocity stream of abrasive particles was made to impinge on the material's surface for a fixed length of time. Typical parameters employed for the erosion screening studies are listed in Table IV.

TABLE IV

High-velocity erosive wear test parameters.

| Erodent | Al$_2$O$_3$ |
| --- | --- |
| Ave. erodent particle size | 100-200 microns |
| Hardness of erodent | 20 GPa |
| Elastic modulus of erodent | 375 GPa |
| Particulate velocity | 100 m/s |
| Nozzle diameter | 10.4 mm |
| Nozzle length | 80.2 mm |
| Stand-off distance | 1 inch (25.4 mm) |
| Erosion angles | 45° and 90° |

Maximum erosion in plastically-deforming materials (e.g., metals) typically occurs at an angle of incidence near 20°, while in materials for which the primary failure mode is brittle fracture, maximum erosion occurs near normal incidence. An angle of 45° was also selected in order to evaluate the material's response at an intermediate orientation, which is frequently encountered in wear-intensive applications. In order to follow the accumulation of surface damage, sequential erosion was performed on a number of samples for varying amounts of time. The surface was examined in an SEM following each exposure to the erosive particle flux.

Figure 4:
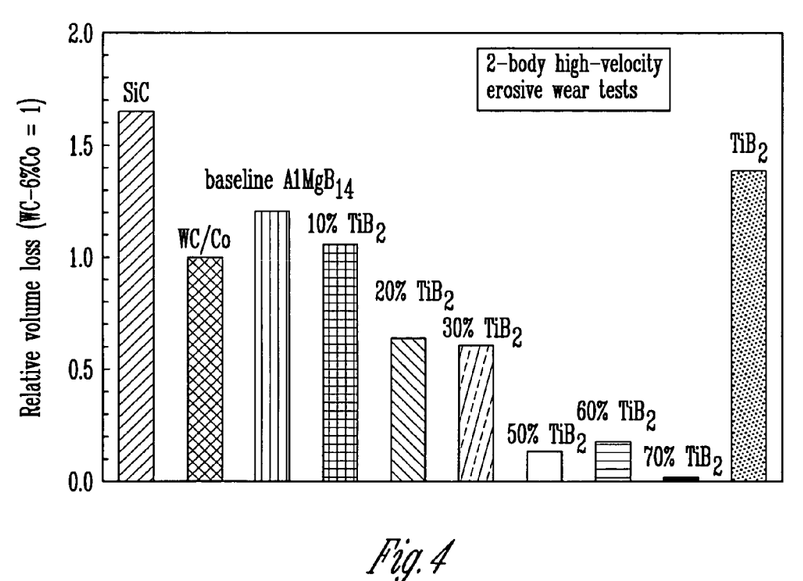
FIG. 4 shows the relative erosive wear resistance of various materials, demonstrating the effect of $TiB_2$ addition to $AlMgB_{14}$.
Figure 5:
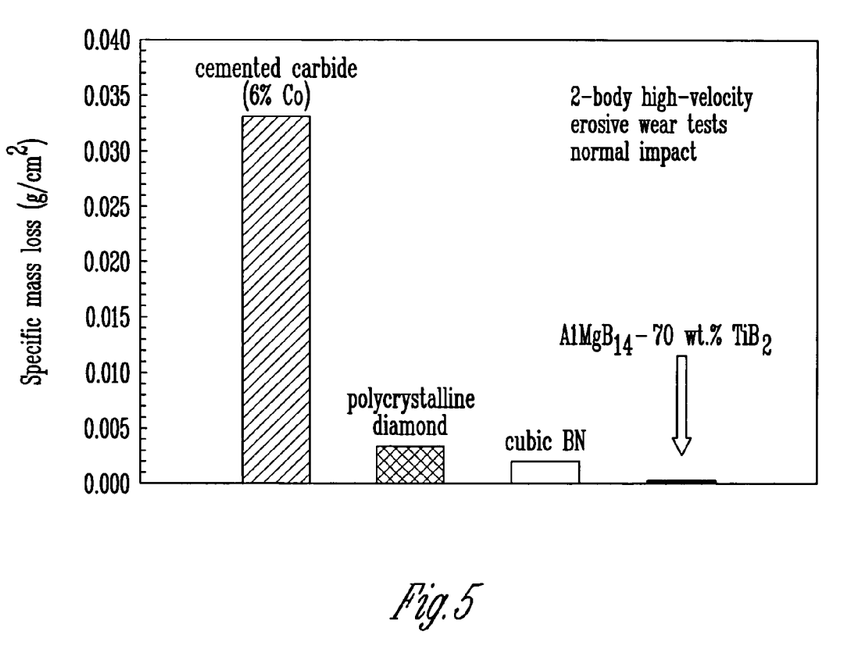
FIG. 5 compares the specific wear resistance of selected hard materials.

As in the case of abrasive wear resistance, the addition of TiB$_2$ in weight percentages exceeding 30% was found to result in an unexpected increase in erosive wear resistance. FIG. 4 shows the relative erosive wear resistance of AlMgB$_{14}$, AlMgB$_{14}$-70 wt. % TiB$_2$, and other degradation resistant materials such as SiC and cemented carbide. The wear volume for each sample has been normalized to that of cemented carbide. FIG. 5 shows the specific wear resistance in grams per square centimeter of the most wear resistant materials, including polycrystalline diamond (large-grained) and cubic BN.

Secondary electron microscopy imaging of the 70 wt. % sample following 5 seconds of erosion indicated incipient fracture without large scale cracking of the TiB$_2$. No fracture of the boride matrix itself was observed following the 65 and 125 seconds of erosion. No large scale chipping or cracking of the sample was visible as well. Some evidence of material flow parallel to the erodent direction was observed after 125 seconds of erosion.

The primary oxidation product of AlMgB$_{14}$ is boron oxide, B$_2$O$_3$, which melts at a temperature of approximately 450° C. In order to determine if the impacting alumina particles could generate sufficient local heating to melt the boron oxide, a calculation was performed in which a particle impact was modeled as an indentation, with the energy of plastic deformation assumed to be entirely converted into heat. Based on this assumption, one can write an expression of the form $$fP\delta z = mc\Delta T \quad [2]$$

where P is the impact load, $\delta z$ is the penetration depth, m is the particle mass, c is the heat capacity, $\Delta T$ is the local temperature increase, and f is the fraction of indentation energy dissipated within the plastic zone. For this exercise, f is assumed to be 0.4 (40%). The plastic zone radius is taken as 20 microns. Results of the calculation show that temperature increases on the order of 400 to 700 degrees are possible within the local plastic deformation region. This phenomenon is thought to provide a positive contribution to the erosion resistance in the boride composites for the following reason. Damage and degradation to the surface result from a conversion and transfer of kinetic energy of the erodent particles. This energy can be dissipated in one of several forms: into the work of fracture (e.g., cohesive energy) of the surface and/or of the particle itself, or into thermal energy. In the case of metals, the added thermal energy can act to improve erosion resistance by increasing ductility. If a relatively low-melting oxide is present, some of the energy is consumed in melting the oxide and less is available to initiate fracture within the material. In this way, the oxide serves as an energy dissipative mechanism, carrying away some of the energy that would otherwise be dissipated in the breaking of chemical bonds within the material.

Imaging of the boride surface via secondary electron imaging following a 125 second erosion run at 45° revealed no evidence of fracture. The surface of the boride is seen to be relatively smooth and free from cracks. The erosion of brittle materials typically proceeds by repeated fracture from particle impacts followed by the ejection of chips that form as the microcracks coalesce.

In order to unambiguously establish the steady-state erosive wear effects of the TiB$_2$ reinforcement phase, two boride samples, prepared and tested under otherwise identical conditions but differing only by the presence of 70 wt. % TiB$_2$ in one, were subjected to normal erosive impact for a total time of 10 minutes in a high-velocity (~100 m/s) grit blaster. The baseline boride, without TiB$_2$, exhibited a steady-state wear rate of 0.05 mg/cm$^2$-s, intermediate between that of the AlMgB$_{14}$—TiB$_2$ composite and cemented carbide.

The mechanisms responsible for damage resulting from the impact of abrasive particles can be inferred by examination of the surface of a boride composite sample following a brief exposure to high-velocity erodent particles. A 70 wt. % TiB$_2$ boride composite was subjected to a 2-second exposure to 100 m/s alumina grit at an impact angle of 45°, after which the surface was rinsed with ethanol, dried with compressed air, and examined in a scanning electron microscope. The purpose was to determine if the nucleation of microcracks could be identified, the results then employed in subsequent refinement of the microstructure. Detailed observation of a large number of regions within the original particle flux eventually revealed that the primary phase responsible for initiation of damage is the TiB$_2$ phase. The primary damage mechanism in the boride composites is fracture and grain pullout of the TiB$_2$.

Quantitative ASTM Erosion Tests on AlMgB$_{14}$-70 wt. % TiB$_2$:

Having established the superior abrasion resistance of the AlMgB$_{14}$-70 wt. % TiB$_2$ alloys in diamond belt tests, and the relative erosion resistance in comparative high-velocity erosion tests, three samples of hard material (WC-6% Co: K-68, AlMgB$_{14}$-70 wt. % TiB$_2$: TC-M2, and AlMgB$_{14}$-70 wt. % TiB$_2$: TC2-M1) were evaluated for quantitative erosion resistance using an ASTM G76 gas jet erosion tester. Multi-hour erosion tests were performed and cumulative mass loss was plotted as a function of time.

Test Equipment and Procedure

The equipment and procedure for erosion testing followed ASTM G76 *Standard Practice for Conducting Erosion Tests by Solid Particle Impingement Using Gas Jets*. A powder feed system mixes a chosen abrasive into a gas stream at a fixed rate. The gas stream is then delivered to a 1.5 mm inner diameter, WC nozzle where the stream is ejected into the local atmosphere and against the target. The test procedure consisted of specimen preparation, cleaning, weighing, erosion, post-erosion cleaning, and re-weighing for mass loss determination. The carrier gas for these experiments was commercial grade nitrogen. The abrasive was 50 micron $Al_2O_3$ powder and the particle velocity, as determined by a double disk calibration technique, was 40 m/sec. The distance between the end of the nozzle and target, as described in the ASTM recommendation, was 1 cm. Erosion was performed in sequential intervals of 30 to 60 minutes, for a cumulative erosion time of 4 hours. This time was chosen to achieve good mass change accuracy. All erosion occurred in the same crater. The particle loading of the gas stream was such that 2 g/min were delivered against the specimen. This was checked before and after each test and flow was maintained within 5%. The target specimens were impinged at 90°. Duplicate tests were performed on the front and back sides of each sample.

Results

Erosion test results demonstrated good linearity between cumulative mass loss and erosion test elapsed time on WC—Co test specimens. The cumulative mass loss reached an average value of 14 mg following 4 hours of testing.

The cumulative mass loss data versus test time for the two $AlMgB_{14}$-70 wt. % $TiB_2$ composites demonstrated more scatter in the data as a result of the exceptionally low mass loss per unit testing time, challenging the resolution of the balance. At no point did mass loss exceed 0.25 mg, and in most cases was less than half this value or not measurable.

Table V summarizes the erosion rates for these materials, as determined by equation 1, $$\text{Erosion Rate} = \left(\frac{\Delta m}{t}\right)\left(\frac{1}{\Phi}\right)\left(\frac{1}{\rho}\right) \quad (1)$$

Where $\Delta m$ is the mass loss, t is the test time, $\Phi$ is the particle mass flow rate in the gas stream and is equal to 2 g/min, and $\rho$ is the density of the target sample.

The measured erosion rates for the $AlMgB_{14}$-70 wt. % $TiB_2$ composite hard materials are far superior to that of K-68, which is a WC—Co cermet with a grain size range of 1-4 μm. The binder is 5.7% Co, 1.9% Ta, 0.2% Ti (max) and 0.3% Nb (max) by weight. In general, the wear resistance of WC—Co materials increases with a decrease in grain size (up to a point). The K-68 grade of WC—Co at this binder content would be classified as very wear resistant. The $AlMgB_{14}$-70 wt. % $TiB_2$ have a factor of 20 lower erosion rate than the K-68.

TABLE V

Erosion Rates and Standard Deviation of WC-6% Co (K-68) and Two Samples of $AlMgB_{14}$ - 70 wt. % $TiB_2$ (TC-M1 and TC-M2) as Determined by ASTM G76 Erosion Tests.

| Material Designation | Density (mg) | Erosion Rate[1] ($\times 10^{-4}$ mm$^3$/g) | Standard Dev. ($\times 10^{-4}$ mm$^3$/g) |
|---|---|---|---|
| WC-Co | 14.30 | 19.93 | 1.05 |
| TC-M2 | 3.75 | 0.50 | 0.19 |
| TC2-M1 | 3.75 | 1.11 | 0.83 |

[1]erosion rate is specified by eroded volume per unit mass of erodent

From the above identified examples and particularly the data illustrated in FIGS. 2-5, it can be seen that surprisingly and contrary to the state of the art literature, compositions that contain 40 to 90% by weight of $TiB_2$ exhibit superior wear resistance, and that the preferred composition range falls between about 50% and 70% $TiB_2$ by weight. Preliminary coating trials using pulsed laser deposition have shown that mixed phase borides of the form (M1M2$B_{14}$-M3$B_2$), where M1 and M2 are comprised of metal-like elements from the group (Al, Mg, Li, Gd, Ag, Na, Tm, Er, Y, Ho, Sc, Cr) and M3 is comprised of an element or elements taken from the group (Ti, Zr, Hf) or combinations thereof, can be formed into protective coatings on various substrate materials. Taken in this form, the protective coating could also be used to impart wear resistance to components operating in abrasive or erosive environments. Additionally, proof-of-concept studies have shown that the toughness of the wear resistant ceramic composites can be enhanced through the addition of a metallic binder phase, such as Co, Fe, Mn, Ni, and combinations thereof.

What is claimed is:

1. A wear-resistant ceramic composite comprising a sintered, hot pressed, or otherwise compacted boride composite consisting of two discrete phases, wherein the first phase is an orthorhombic compound of the form $Al_xMg_yB_{14}$, where x and y $\leq 1$ and Al and/or Mg may be replaced by elements selected from the group consisting of Aluminum, Magnesium, Lithium, Gadolinium, Silver, Sodium, Thulium, Erbium, Yttrium, Holmium, Scandium and Chromium, each of which are known to form a similar chemical structure as $AlMgB_{14}$, and the second phase is $TiB_2$ or other Group IVB transition metal diborides, and where the weight percentage of transition metal diboride is within the range of from about 40 to about 90 percent.

2. The ceramic of claim 1 comprising from about 50% to 70% by weight of the di-boride phase.

3. The ceramic of claim 1 wherein the transition metal di-boride is selected from the group of Titanium Boride, Zirconium Boride, and Hafnium Boride.

4. The ceramic of claim 1 wherein the grain size is less than 1 micron.

5. The ceramic of claim 1 wherein a metallic binder phase is selected from the group consisting of Cobalt, Magnesium, Nickel and Iron or combinations thereof is used to facilitate densification and improve fracture toughness of the composite.

6. A substrate coated with the wear-resistant ceramic of claim 1.

7. A substrate coated with the wear-resistant ceramic of claim 2.

8. A substrate coated with the wear-resistant ceramic of claim 3.

9. A substrate coated with the wear-resistant ceramic of claim 4.

10. A substrate coated with the wear-resistant ceramic of claim 5.

11. An abrasive composite covered with small pieces of the ceramic of claim 1 adhered thereto.

12. An abrasive composite covered with small pieces of the ceramic of claim 2 adhered thereto.

13. An abrasive composite covered with small pieces of the ceramic of claim 3 adhered thereto.

14. An abrasive composite covered with small pieces of the ceramic of claim 4 adhered thereto.

15. An abrasive composite covered with small pieces of the ceramic of claim 5 adhered thereto.

* * * * *